(No Model.)
C. MEYER, Jr.
APPARATUS FOR THE MANUFACTURE OF AMMONIUM SULPHATE.
No. 316,381. Patented Apr. 21, 1885.
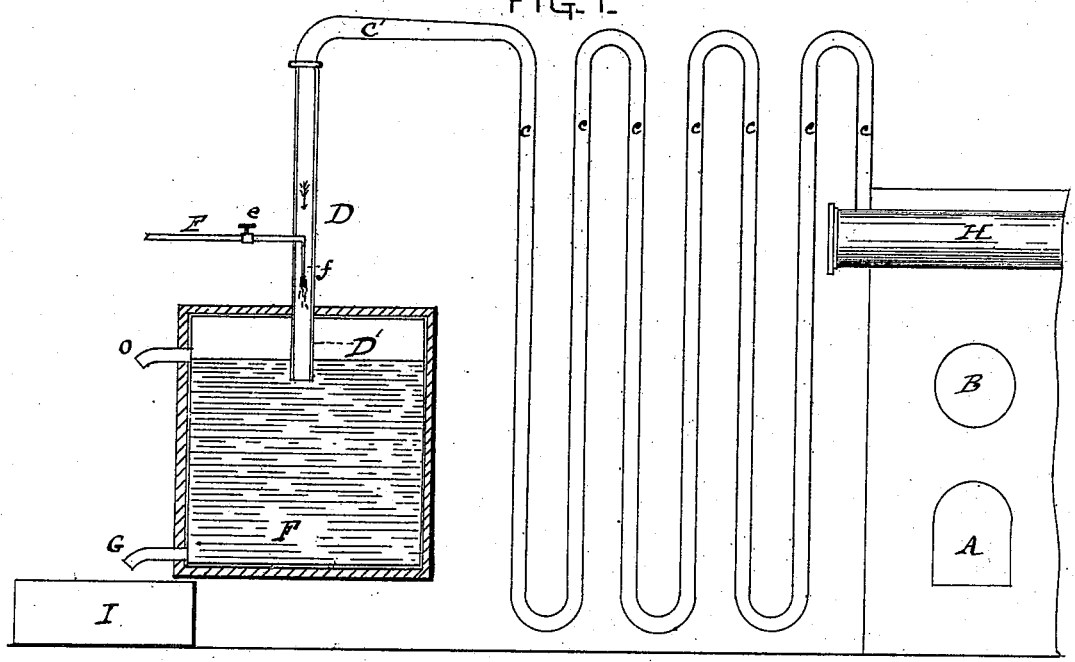
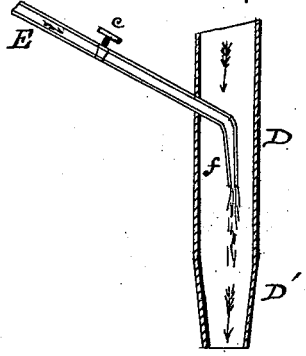
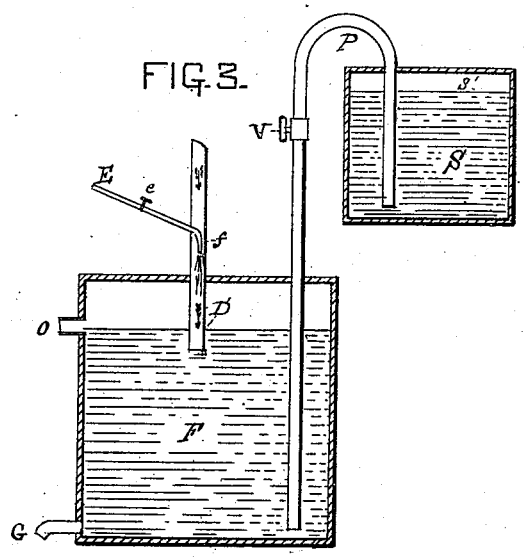
WITNESSES:
INVENTOR
BY
ATTORNEY

UNITED STATES PATENT OFFICE.

CORD MEYER, JR., OF MASPETH, NEW YORK.

APPARATUS FOR THE MANUFACTURE OF AMMONIUM SULPHATE.

SPECIFICATION forming part of Letters Patent No. 316,381, dated April 21, 1885.

Application filed November 16, 1882. (No model.)

*To all whom it may concern:*

Be it known that I, CORD MEYER, Jr., of Maspeth, Queens county, State of New York, have invented certain new and useful Improvements in the Manufacture of Sulphate of Ammonia; and I do hereby declare that the following is a full, clear, and exact description of the same, reference being had to the accompanying drawings, forming part of this specification.

This invention relates to certain improvements in the manufacture of sulphate of ammonia from the ammonia evolved in the carbonization of bones and other animal matters in the manufacture of bone or ivory black, its object being to manufacture such sulphate in an economical manner by preventing any possible escape of the ammoniacal gases, and also to save the cost and expense of a large portion of the machinery or apparatus now employed for such manufacture.

To enable others skilled in the art to use my invention, I will now proceed to describe the method and apparatus employed.

I first provide that the main eduction-pipe which carries away from the retorts the ammonical gaseous products of the carbonization of bones or animal matter in such retorts extend at its outer extremity below the surface of sulphuric acid placed in a suitable tank to such depth that the ammoniacal gaseous products do not discharge themselves through the liquid acid as placed in said tank. I further provide a jet of high-pressure steam in said eduction-pipe directed toward the outlet in the tank of said eduction-pipe, and in proximity to said outlet, which jet of steam so placed mechanically drives said gaseous ammoniacal products with great force into said acid, and at the same time agitates the whole body of acid in such manner that fresh acid is continuously presented to the ammoniacal gases. Sulphate of ammonia is thus rapidly and expeditiously formed without waste in the tank in solution, and this without the aid of condensing or special absorbing apparatus, the action of the jet of high-pressure steam being mechanical, as its temperature is too high to absorb any ammoniacal gas and its quantity too inconsiderable to be considered in the formation of the solution of the salt.

My further invention relates to the convenient arrangement of the apparatus by which such method can be practiced, reference being had to the accompanying drawings.

It is obvious that other salts of ammonia can be produced by same method by changing the absorbent liquid.

The following is a description of the apparatus and the letter-references to the drawings, and descriptive of the mode of operation more in detail.

Figure 1 represents the apparatus employed. A is the furnace containing the retort B, in which the carbonization of the animal matter is effected. The retort B is connected in the usual manner with the hydraulic main H and with a "tar purifier," so called, represented by the pipe bent at C C, &c. The portion of this pipe at D is the eduction-pipe proper, the outlet of which extends below the surface of the liquid sulphuric acid in the tank F. E is the pipe conveying high-pressure steam controlled by the cock $e$ and terminating in jet $f$. O is the overflow-outlet to maintain the level of the liquid acid in the tank uniform, in order that the eduction-pipe shall always have a uniform immersion in the acid, as at point D'. G is a drawing-off outlet; I, evaporating-pan.

Fig. 2 shows the eduction-pipe and steam pipe and jet enlarged to be more perspicuous with same letters of reference; D, an eduction-pipe; E, a steam-pipe; $e$, a steam-cock; $f$, a steam-jet. D shows how the eduction-pipe is slightly narrowed near the outlet to assist the operation of the steam-jet.

Fig. 3 shows an apparatus for supplying the sulphuric acid continuously to the tank. F is the tank; O, the overflow-outlet; D, eduction-pipe; E, a steam-pipe; $e$, a steam-cock; $f$, a steam-jet; G, the drawing-off cock. P is a siphon proceeding from a point near the bottom of the tank to the reservoir of acid, S. The supply of the tank, the siphon being first filled, is regulated by the stop-cock V, according to the manufacture of the sulphate of ammonia in tank F.

The operation to form sulphate of ammonia by this apparatus according to the method stated is as follows: The gaseous ammoniacal products of the carbonization of the animal matter in the retort B pressing through the hydraulic main H, and pipes C C, &c., depositing any liquid or solid residuum, enter eduction-pipe D and come in contact with the liquid acid in F; but as the surface of such acid would be but the diameter of the pipe no useful result would obtain. On opening the steam-cock e a jet of high-pressure steam is thrown through the jet f or nozzle of the steam-pipe toward the acid, and by its mechanical force drives the ammoniacal gases down and through said acid in the tank F, where they are instantly absorbed by said acid, forming sulphate of ammonia, which from time to time is withdrawn by G into evaporating-pan I for evaporation and crystallization in the usual manner of the manufacture of salts.

The operation of the continuous acid-feed has already been explained.

I claim—

In apparatus for the manufacture of sulphate of ammonia, the combination of the hydraulic main H, purifier-coil C C, induction-pipe D, having a high-pressure steam-injector, E, inserted in it, and its lower end immersed in the acid liquor contained in a closed tank, F, said tank F, overflow-pipe O, outlet-pipe G, and receiving-vessel I, all substantially as shown and described.

CORD MEYER, JR.

Witnesses:
ALONZO GAUBERT,
JOHN M. STEARNS.